United States Patent [19]
Simmons

[11] 3,937,483
[45] Feb. 10, 1976

[54] TOBOGGAN RUDDER
[76] Inventor: Charles J. Simmons, 200 Pleasant St., East Longmeadow, Mass. 01028
[22] Filed: Dec. 13, 1974
[21] Appl. No.: 532,499

[52] U.S. Cl. ............................................. 280/21 R
[51] Int. Cl.² .......................................... B62B 13/16
[58] Field of Search ................... 280/21 R, 18, 12 R

[56] References Cited
UNITED STATES PATENTS
731,925   6/1903   Marqua .............................. 280/21 R
1,475,877  11/1923  Regan ............................... 280/21 R Primary Examiner—Robert R. Song

[57] ABSTRACT

A rudder-like device to add manuverability to toboggans and toboggan-like vehicles. The device incorporates a housing into which the rudder can be withdrawn for safety purposes. The housing also acts as a means of guiding the rudder and relieving the torque thereon due to the force of the snow.

1 Claim, 2 Drawing Figures

TOBOGGAN RUDDER

BACKGROUND OF THE INVENTION

In the past, use of a toboggan has often resulted in hazardous safety conditions due to the fact that coventional toboggan designs have no provision for manuvering if an unexpected obstruction is encountered. Toboggans and similar vehicles, being supported by snow or snow-like material when in use, are able to utilize a steering mechanism similar to a boat rudder in that a rudder blade produces a torque on the toboggan when inserted into the snow at an angle to the direction of motion. Said torque then results in a steering action when the rudder is attached to the toboggan.

SUMMARY OF THE INVENTION

This invention provides a means of guiding and housing a steering rudder for toboggans which can be introduced into the snow at an angle to the direction of toboggan motion. By providing a protective housing into which the rudder can be drawn, the maximum amount of safety is provided when the rudder is not being used. Also, by varying the amount that the rudder projects into the snow, one can control the degree to which the steering action takes place.

An object of the invention is to provide a device which adds steering ability to toboggans and toboggan-type vehicles.

A further object is to provide both left and right steering ability to said vehicles in a manually selectable manner.

It is also an object to provide means of automatically withdrawing said steering device into a protective shell for safety purposes.

These and other objects will be made apparent in the disclosure of the accompanying drawings and in the following specifications and claims:

DETAILED DESCRIPTION

Figure 1:
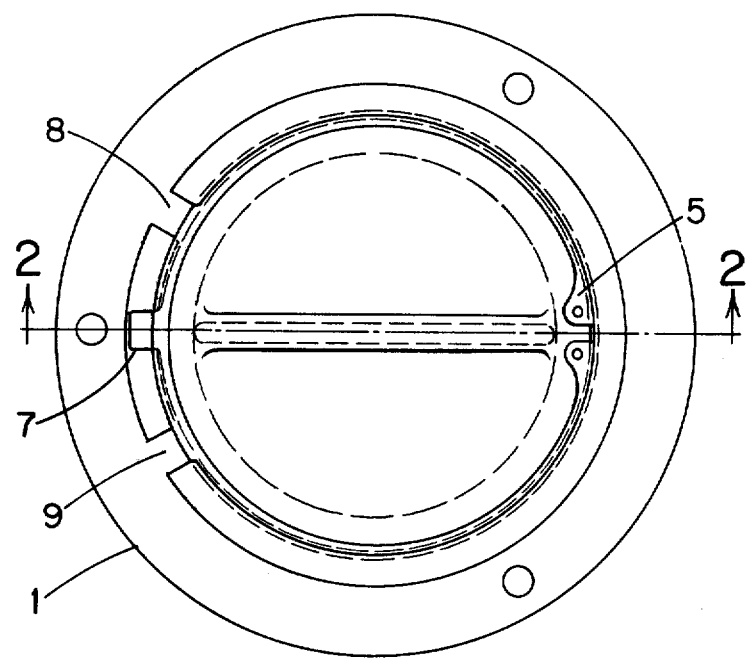
FIG. 1 is a top view of the rudder assembly.
Figure 2:
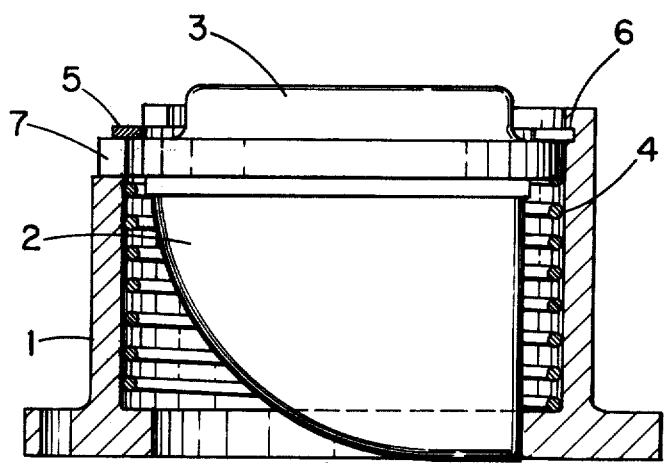
FIG. 2 is a side sectional view of the rudder assembly, being taken along the line 2—2 of FIG. 1.

Referring to FIG. 2, the TOBOGGAN RUDDER assembly is shown as comprising a shell indicated at 1, a rudder indicated at 2, a control knob indicated at 3, a coil spring indicated at 4, and a snap ring indicated at 5.

Referring to FIG. 2, the rudder assembly, when mounted on a toboggan or similar vehicle, operates as follows with the indicated features:

The coil spring 4 acts to keep the rudder 2 which is attached to the control knob 3 in a recessed and thereby safe position when not in use. The control knob and rudder are retained by a snap ring 5, said snap ring fitting into slot 6 in the shell 1.

The steering action is executed by first turning the knob until the tab 7 on the knob lines up with either slot 8 or 9 in the shell. The knob is then depressed thereby causing the rudder to protrude through a slot in the bottom of the toboggan and into the snow. The rudder, having a surface at an angle to the direction of vehicle motion, then results in a force that produces a turning action on the vehicle. The amount of turning action is controlled by the amount that the knob is depressed, thereby varying the amount of rudder area exposed to the snow.

When the knob is depressed with the vehicle in motion, there is a resulting torque on the rudder which would tend to return the knob to its neutral position. It is the purpose of tab 7 when in slot 8 or 9 to relieve this torque and allow ease of operation.

I claim as my invention:

1. A device used for steering toboggans and like vehicles, said device being contained in a protective shell or housing mounted on a toboggan or an extension thereof entirely above the surface of snow and consisting of means for extending a steering element from a retracted position within said housing into the snow at an angle to the direction of vehicle motion, said steering element having a surface against which the snow exerts a force to produce steering action, wherein said device contains means for relieving the torque produced on the steering element by the forward motion of the vehicle, said relieving means consisting of a projection or tab and a slot into which said projection fits, said projection and slot being in combination between the housing and the steering element such that when the steering element is in its active position, that is, at an angle to cause left or right hand turning action, the projection is within the slot and acts to relieve the torque thereby allowing reduced size and effort on a knob or handle of the steering element.

* * * * *